United States Patent
Carder

(10) Patent No.: US 11,795,048 B2
(45) Date of Patent: Oct. 24, 2023

(54) HIGH PRESSURE FUEL NOZZLE LEAK STOP ASSEMBLY

(71) Applicant: M. Carder Industries, Inc., Fenton, MO (US)

(72) Inventor: Randall Carder, De Soto, MO (US)

(73) Assignee: M. Carder Industries, Inc., Fenton, MO (US)

( * ) Notice: Subject to any disclaimer, the term of this patent is extended or adjusted under 35 U.S.C. 154(b) by 0 days.

(21) Appl. No.: 17/540,351

(22) Filed: Dec. 2, 2021

(65) Prior Publication Data

US 2022/0169495 A1  Jun. 2, 2022

Related U.S. Application Data

(60) Provisional application No. 63/120,485, filed on Dec. 2, 2020.

(51) Int. Cl.
| | |
|---|---|
| *B67D 7/04* | (2010.01) |
| *F16K 15/02* | (2006.01) |
| *B67D 7/32* | (2010.01) |
| *F16K 1/42* | (2006.01) |
| *F16K 39/02* | (2006.01) |

(52) U.S. Cl.
CPC ............ *B67D 7/3209* (2013.01); *B67D 7/04* (2013.01); *F16K 1/42* (2013.01); *F16K 15/026* (2013.01); *F16K 39/02* (2013.01)

(58) Field of Classification Search
CPC .......... B67D 7/3209; B67D 7/04; B67D 7/44; B67D 7/52; F16K 15/026
USPC .................... 137/540, 543, 543.13
See application file for complete search history.

(56) References Cited

U.S. PATENT DOCUMENTS

| | | | | |
|---|---|---|---|---|
| 2,367,106 A | * | 1/1945 | Dolch ..................... | F16K 47/12 |
| | | | | 137/540 |
| 4,036,435 A | * | 7/1977 | Pecaro .................. | A01G 25/023 |
| | | | | 239/452 |
| 4,139,031 A | * | 2/1979 | Wood ....................... | B67D 7/48 |
| | | | | 141/206 |

* cited by examiner

*Primary Examiner* — Paul J Gray
(74) *Attorney, Agent, or Firm* — Churovich Law, LLC

(57) ABSTRACT

A leak stop assembly for an automatic shut-off fluid nozzle having a fluid flow path and a check valve with a through bore in the flow path. The assembly includes a bleeder seat that houses a length of the flow path proximate the check valve, a rubber plug, and a rigid cross-brace attached to the bleeder seat and holding the plug. Fluid flows around the check valve when open. The cross-brace positions the plug relative to the check valve through bore such that the plug seals against the check valve through bore when the check valve is closed.

8 Claims, 8 Drawing Sheets

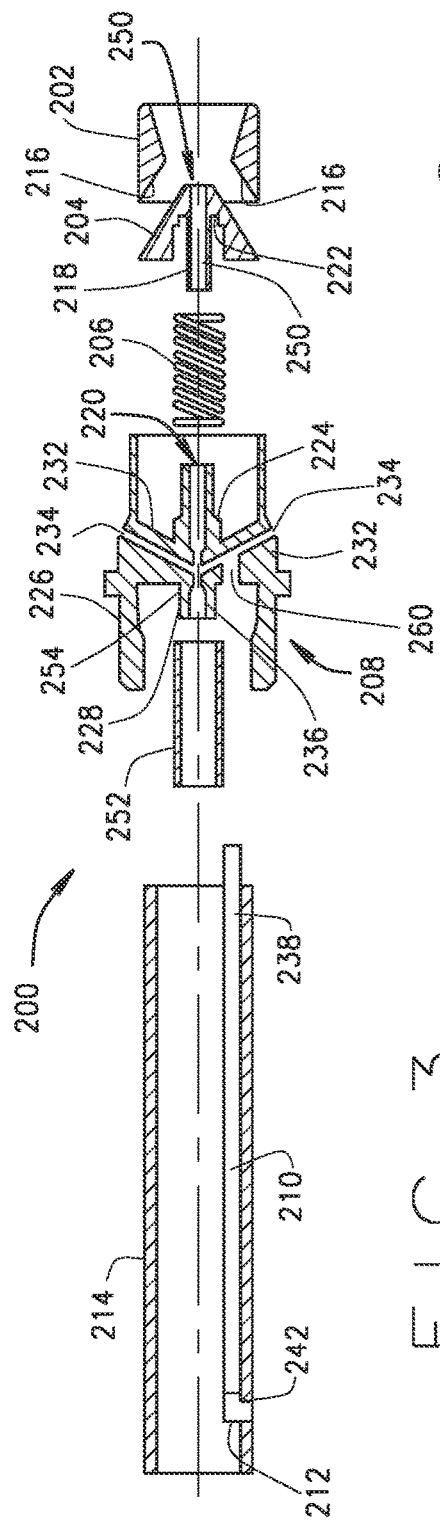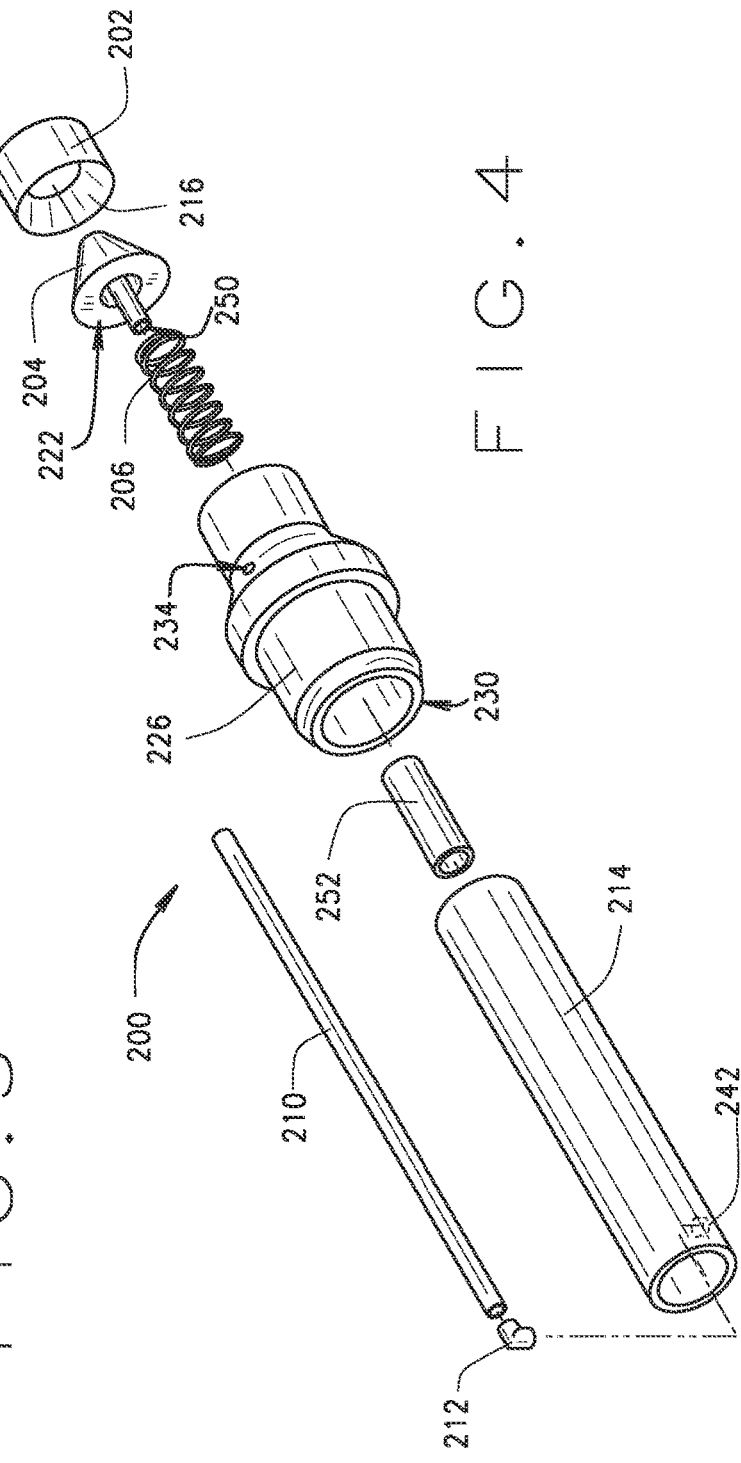

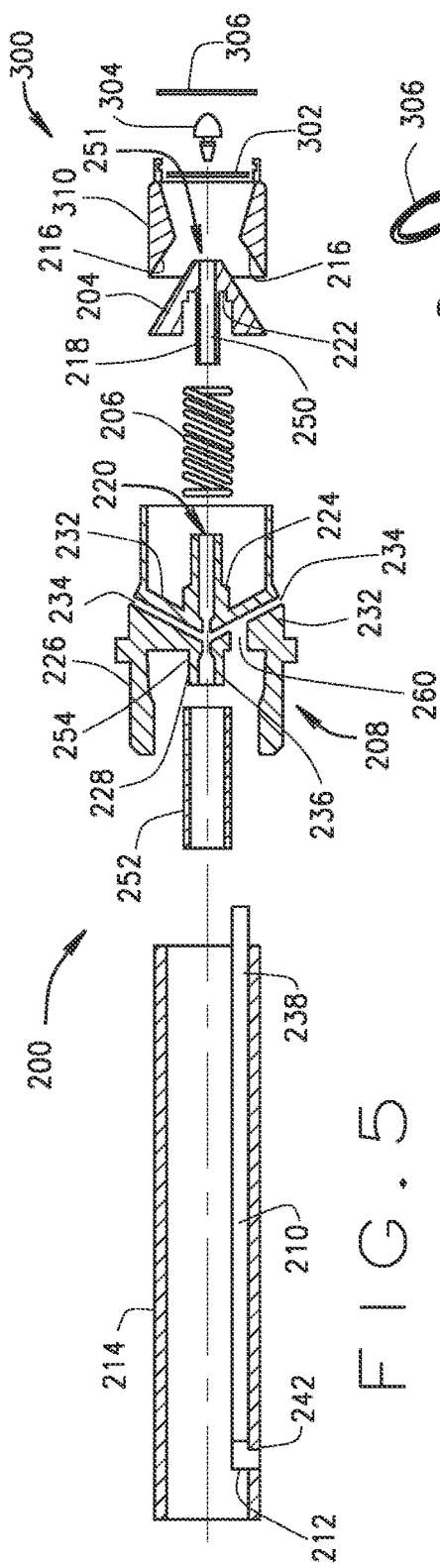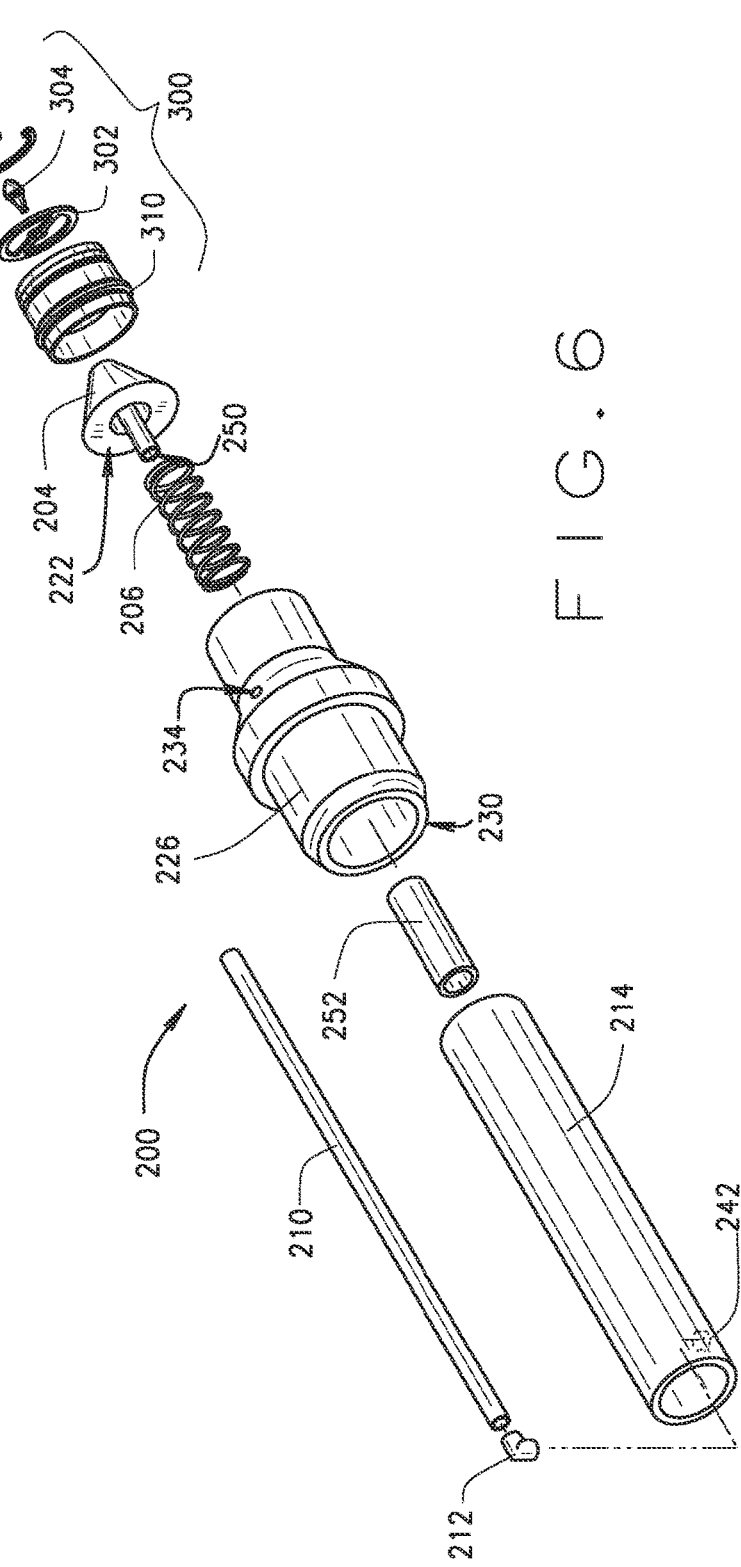

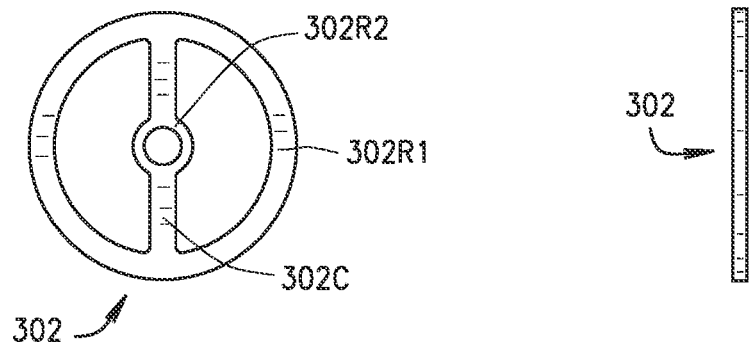
FIG. 9
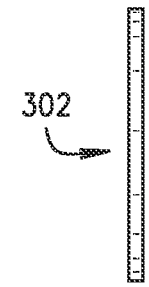
FIG. 10
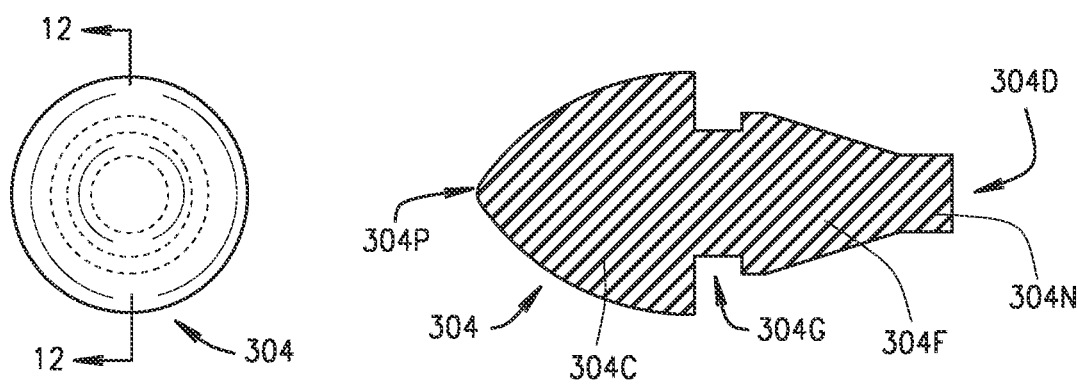
FIG. 11
FIG. 12

HIGH PRESSURE FUEL NOZZLE LEAK STOP ASSEMBLY

CROSS REFERENCE TO RELATED APPLICATIONS

This application derives and claims priority from U.S. provisional application 63/120,485 filed 2 Dec. 2020, which application is incorporated herein by reference.

STATEMENT REGARDING FEDERALLY SPONSORED RESEARCH OR DEVELOPMENT

Not applicable.

BACKGROUND OF THE INVENTION

This invention relates to a dispensing nozzle of the type used for dispensing liquid fuels such as gasoline and the like. It is particularly directed to a leak stop device for a dispensing nozzle having an improved mechanism for accommodating the dispensing of such fuels at elevated pressures developed by the same inventor here.

That is, traditional fluid dispensing nozzles, and in particular nozzles for dispensing gasoline and oils, conventionally include a casing having an inlet and an outlet, an outlet spout assembly, a poppet valve for controlling flow between the inlet and outlet spout assembly, and an automatic diaphragm shut-off assembly. The poppet is urged downwardly against its seat by a spring. A valve stem, which is operated by a manually operated lever or handle, opens the poppet valve against the force of the spring. The plunger of an automatic shut-off assembly forms a pivot for the lever at the forward end of the lever.

The lever is typically S-shaped, including a forward arm pivoted to the plunger of the automatic shut-off means and also engaging the valve stem of the poppet valve, an intermediate portion, and a rearward hand-hold.

In a typical construction, fluid flows around a check valve attached to a spout adapter upstream of the spout, and then past four radial bores in the spout adapter. The fluid flow past the four radial bores creates a venturi vacuum in the bores. Small channels in the nozzle connect the radial bores in the spout adapter to the nozzle's diaphragm assembly, and a spout vent communicating with the spout adapter limits the strength of the vacuum that is drawn on the diaphragm. The venturi vacuum created in the spout adaptor communicates with the diaphragm to control the operation of the diaphragm. That is, when the vacuum reaches a predetermined strength, the diaphragm will shut off the flow of fluid. However, so long as the spout vent is open and thereby maintaining the vacuum at a level that is weaker than what is required to trigger the diaphragm, the diaphragm will remain open and allow the flow of fluid through the spout. Consequently, when the venturi no longer can exhaust itself through the spout vent, such as for example when the fluid tank being filled by the nozzle is full and fluid fills the spout vent, the diaphragm is then subjected to a stronger vacuum and shuts off the flow of fluid to the spout. Thus, this venturi creates a vacuum in the shut-off assembly that triggers the shut-off valve and stops the flow of fluid through the nozzle when the spout vent fills with fluid.

This configuration works well for most traditional fuel nozzles having low and moderate pressure conditions (i.e., below approximately 60 psi). However, when such traditional nozzles are subjected to high pressure conditions in the spout (i.e., greater than approximately 60 psi, and certainly in 100 psi or higher range, the fluid can back up into the spout even when the tank being supplied with fluid has not yet filled. This can overwhelm the four radial bores in the spout adapter and shut down the venturi vacuum. This in turn releases the diaphragm in the diaphragm assembly and prematurely shuts off the flow of fluid through the nozzle to the spout.

To address that need, the inventor here has developed a nozzle configuration that accommodates high flow conditions through the nozzle's spout without suffering from premature shut-off of or failure to shut-off the fluid flow due to inadvertent disablement of the venturi vacuum in the spout adaptor region of the nozzle, which is disclosed and claimed in U.S. Pat. No. 11,124,409, having issued Sep. 21, 2021 (the "'409 Patent", which Issued Patent is incorporated by reference herein). The '409 Patent nozzle incorporates a direct flow cross member that provides a limited volume fluid flow path that creates the venturi without the potential for being overwhelmed by a higher-pressure flow in the nozzle. Unfortunately, it has been learned that the '409 Patent nozzle design has a tendency to leak small amounts of fluid through the limited volume fluid flow path after the nozzle is shut off. Although the amount of such leakage is quite minimal, it would be desirable to modify the '409 Patent to prevent such fluid leakage.

BRIEF DESCRIPTION OF THE SEVERAL VIEWS OF THE DRAWINGS

The illustrative embodiments of the present invention are shown in the following drawings which form a part of the specification:

FIG. 3 is an exploded cross-sectional view of FIG. 2.

FIG. 4 is an exploded perspective view of FIG. 2.

FIG. 5 is an exploded cross-sectional view of the spout, spout adapter, and related components of the nozzle of FIG. 1.

FIG. 6 is a perspective end view of FIG. 5.

FIG. 9 is an axial view of the cross member of the leak stop assembly of FIG. 1.

FIG. 10 is a side view of the cross member of FIG. 9.

FIG. 11 is an axial view of the plug of the leak stop assembly of FIG. 1.

FIG. 12 is a cross-sectional side view of the plug of FIG. 11.

Corresponding reference numerals indicate corresponding parts throughout the several figures of the drawings.

DETAILED DESCRIPTION OF THE INVENTION

While the invention will be described and disclosed here in connection with certain preferred embodiments and its best mode, the description is not intended to limit the invention to the specific embodiments shown and described here. Rather, the invention is intended to cover all alternative embodiments and modifications that fall within the spirit and scope of the invention as defined by the claims included herein as well as any equivalents of the disclosed and claimed invention.

Figure 1:
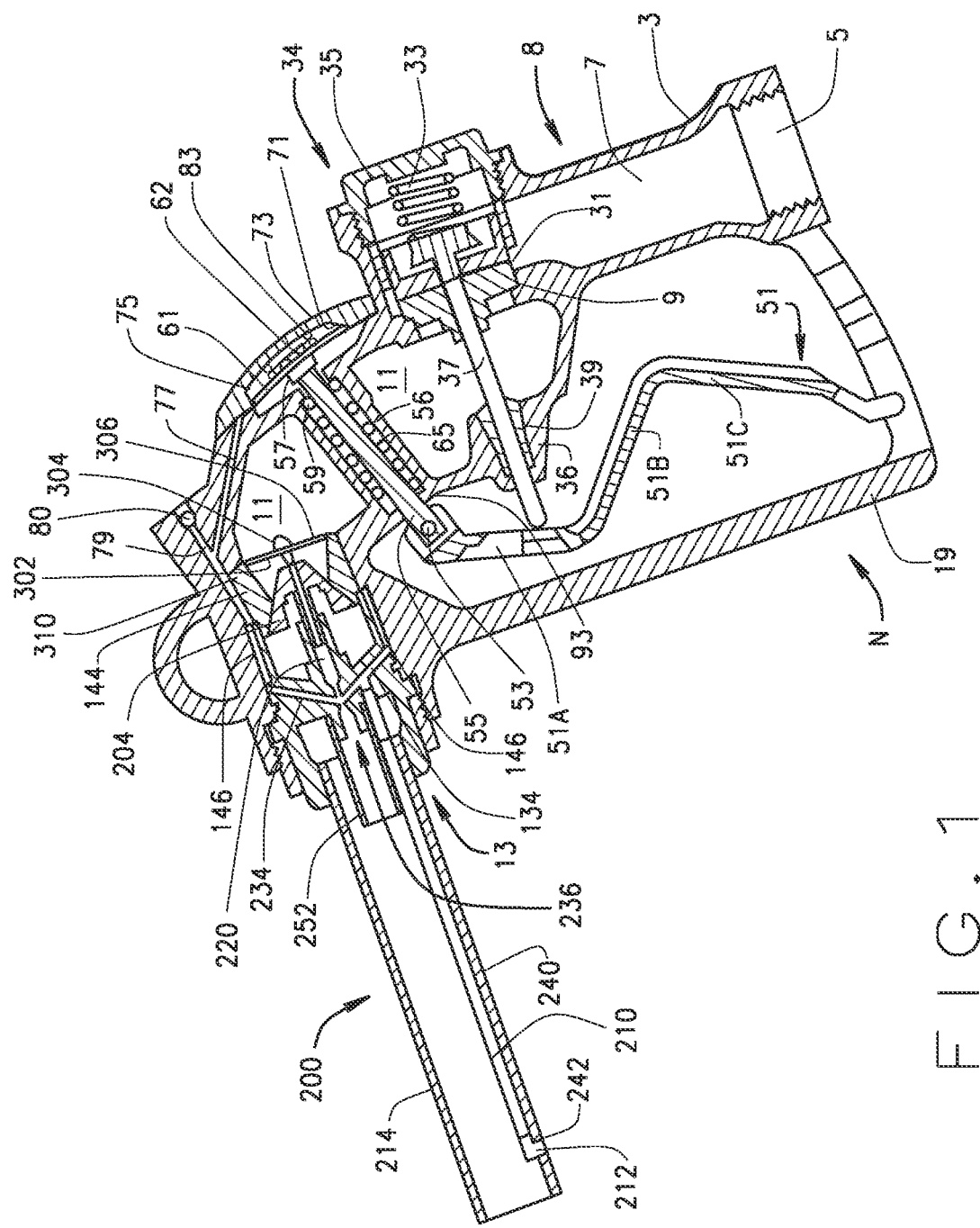
FIG. 1 is a cross-sectional side elevation view of an illustrative nozzle incorporating a high-pressure spout adapter having a leak stop assembly in accordance with one embodiment of the present invention.

In referring to the drawings, a first representative assembly embodiment 300 of the novel high pressure spout leak stop assembly of the present invention is shown generally in FIGS. 1 and 5-6, where the present invention is depicted by way of example, both independently and in association with a representative fluid nozzle N of the '409 Patent. The basic operational details of the nozzle N are described in the '409 Patent and do not, per se, form a part of the present invention.

Briefly, and referring to FIGS. 1-4, the nozzle N includes a cast body 3, preferably formed of aluminum. It has a passage through it including an inlet 5, a generally cylindrical inlet chamber 7, a valve seat 9, an outlet chamber 11 downstream of the valve seat 9, and an outlet 13. Inlet 5 is threaded to receive a flexible hose from a gasoline pump. The portion of the body forming the inlet chamber 7 forms a hand-hold 8 for the nozzle. A hand guard 19 forms part of the cast body 3.

Most of the inner parts of the nozzle N are standard. A main poppet valve assembly 31 is urged by a poppet spring 33 against the valve seat 9 to close the passage through the casing 3. The poppet spring 33 is held in a casing cap 35 threaded into the top of the casing 3. A stem 37 extending from the lower end of the valve 31 is slidably mounted in the casing 3. The lower portion of the stem 37 passes through the casing 3, through a sliding seal 39 positioned in the casing 3.

A standard lever 51 is provided for manually engaging the valve stem 37 and lifting the valve assembly 31 from the valve seat 9. The lever is S-shaped, with a generally horizontal lower lever part, an intermediate part, and an upper hand-hold part.

The forward end of the lever 51 is held by a pivot pin 53 to the lower end of a cylindrical plunger 55 which is mounted for reciprocation in the casing 3 as described in more detail hereinafter. The plunger 55 forms a part of an automatic shut-off system for shutting off the flow of gasoline through the nozzle when the level of gasoline in the tank being filled reaches the end of the spout. The shut-off system includes above the plunger 55, a latch pin 57, three latching balls 59, and a diaphragm 61. A coil plunger spring 65 biases the plunger 55 upward. The latch pin 57 extends into a blind axial bore in the upper end of the plunger 55. Three radial openings extending from the outer surface of the cylindrical plunger 55 into the axial bore act as guideways for the latching balls 59. The upper end of the latch pin 57 is secured to the center of the diaphragm 61. The periphery of the diaphragm 61 is secured to a shoulder 71 of the casing 3 by a vacuum cap 73 and defines with the vacuum cap 73 a pressure chamber 75 in the casing. In addition to the usual threads, the cap 73 includes at least one slot 77 for creating a continuous passage between the pressure chamber 75 and a vacuum passage 79 in the casing. A balance spring 83 on the upper side of the diaphragm 61 positions the latch pin 57 and determines the sensitivity of the automatic shut-off system. That is, the balance spring 83 determines the vacuum level in the pressure chamber 75 that the venturi must achieve in order to activate the diaphragm and shut off flow through the nozzle N.

The portion of the body 3 forming the housing for the shut-off system includes an upstanding generally cylindrical wall 87 forming a housing for the plunger 55. The inner surface of the wall 87 is stepped to form a balance chamber, a chamber for balls 59, and a chamber for spring 65. A ring is beveled inwardly, to form a seat for the balls 59. A wall 93 at the bottom of wall 87 acts as a guide for plunger 55 where it exits the cast body 3 and as a bearing for plunger return spring 65.

As described thus far, the nozzle N is conventional.

Secured in the nozzle N opposite the inlet 5 is a spout assembly. What is shown in FIGS. 2-4 is a representative embodiment of the novel spout assembly 200 disclosed in the '409 Patent.

Figure 2:
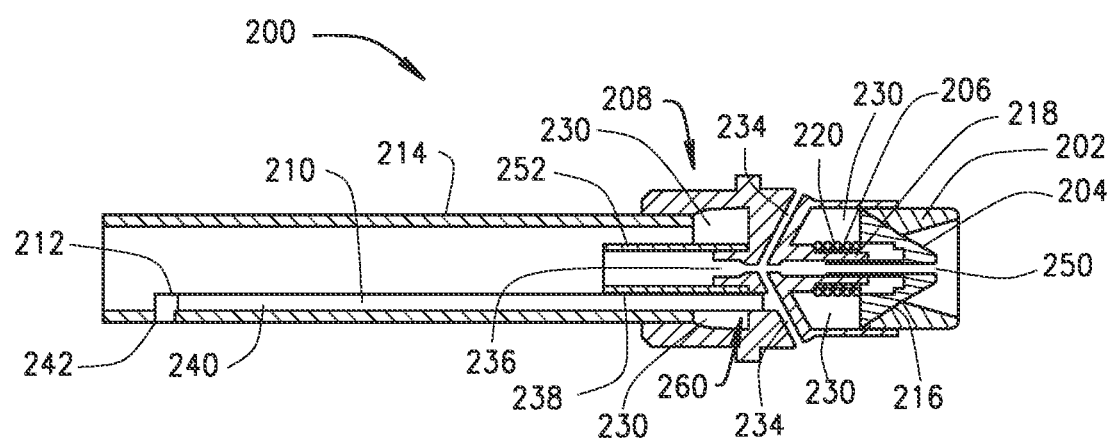
FIG. 2 is a cross-sectional side elevation view side elevation of the spout, spout adapter, and related components of the '409 Patent nozzle.

Referring to FIGS. 2-4, it can be seen that the spout assembly 200 includes a bleeder seat 202, a conical piston-like check valve poppet 204, a check valve spring 206, a spout adapter 208, a bleeder or vent tube 210 with a port adaptor 212, and a spout 214. The vent tube 210 has a proximal end 238 and a distal end 240. As can be seen, the conical walls of the check valve poppet 204 seat against a matching conical wall 216 on the inner surface of the bleeder seat 202. An axial shaft 118, extending outward from the center of the check valve poppet 204 is slidably positioned within a central axial bore 220 in the spout adapter 208. The valve spring 206 is positioned axially about the shaft 218 and is compressed between a neck 222 within the check valve poppet 204 at one end and a ledge or lip 224 along the outer surface of the spout adapter 208. It will be understood that the configuration specifications of the spring 214, and the distance between the neck 222 and lip 224 determine the pressure necessary to overcome the spring load on the check valve poppet 204.

The spout adapter 208 has a generally cylindrical outer body 226 surrounding a generally cylindrical central body 228 that forms a flow channel 230 there between. A set of two arms 232 extend radially and at a slight angle rearward from the central body 228 to the outer body 226. A set of two through bores 234 extend through the center of each of the arms 232 and joint together and open into an axial bore 236 in the central body 228 coaxial with and adjoining the axial bore 220. That is, in contrast to the traditional spout adapter 108, in which the axial bores 120 and 136 do not join (see FIG. 2), in the present disclosure the axial bores 220 and 236 form a contiguous axial bore through the center of the spout adapter 208.

The distal end 240 of the vent tube 210 attaches to the port adaptor 212 which is attached to an opening 242 in the side of the spout 214. The proximal end 238 of the vent tube 210 is secured in a bore 260, located in the side of one of the radial arms 232, that extend to and opens into the radial bore 234 of that radial arm 232. The check valve poppet 204 comprises an axial through bore 250 with an opening 251 in the tip of the check valve poppet 204 that allows fluid from the chamber 11 to flow through the center of the check valve poppet 204, through the axial bores 220 and 236 in the central body of the spout adapter 208, through a rigid plastic back-pressure tube 252 having a length of approximately two inches, which is attached snugly over a short nipple 254 surrounding the axial bore 236, and into the spout 214.

When the spout assembly 200 is properly positioned in the nozzle N, the bleeder seat 202 is secured against, and forms a liquid seal against, a matching inner mating surface 144 formed in the outlet chamber 11 opposite the inlet 5. A cylindrical gap 146 is formed between the outer body 226 of the spout adapter 208 and the inner surface of the body 3 between the mating surface 144 and the spout 214. As can be seen, the channel 79 and the radial bores 234, all open into the gap 146. Of course, the channel 79 opens into the channel 77, which in turn opens into the pressure chamber 75 of the diaphragm assembly. This provides a contiguous open pathway between the axial bore 236 and the pressure chamber 75 in the diaphragm assembly of the nozzle N.

As fluid flows from the inlet 5 through the inlet chamber 7, through the outlet chamber 11, it encounters the check valve poppet 204. If provided sufficient pressure (e.g., greater than 60 psi), the force of the valve spring 206 will be overcome, and the check valve poppet 204 will be forced open. For a very brief instance, the fluid will flow through the bore 250 in the center of the check valve poppet 204, but once the force of the valve spring 206 is overcome and the spring is compressed, the check valve poppet 204 will separate from the bleeder seat 202 such that the fluid will also flow around the perimeter of the check valve poppet 204, through the flow channel 230 in the middle of the spout adapter 208, around the vent tube 210 and through the spout 114. As the fluid flows through the bore 250 in the check valve poppet 204, a venturi is created in the radial bores 234 in the spout adapter 208, which creates a vacuum in the cylindrical gap 146.

This vacuum draws air from the bleeder tube 210 through the bore 260, which precludes the creation of a strong vacuum in the pressure chamber 75. However, when the air supply through the bleeder tube 210 is shut off or substantially reduced, such as when filling a fluid tank and the fluid tank has been filled such that the fluid in the tank covers the opening 242 in the side of the spout 214, the vacuum created by the venturi in the cylindrical gap 146 travels through the channel 79, through the channel 77, and in turn creates a greater vacuum in the pressure chamber 75. This vacuum overpowers the spring 214, thereby activating the diaphragm 61 to shut off flow through the nozzle N.

As can be appreciated from the present disclosure and the '409 Patent, the placement of the venturi in the center of the spout adapter 208 limits the amount of fluid in the vicinity of the venturi and precludes excess high-pressure fluid from clogging, backing up, or otherwise interfering with the proper operation of the venturi. The presence of the backpressure tube 252 further enhances this protective configuration to prevent excess fluid flowing rapidly through the flow channel 230 from backing up into the axial bore 236 and interfering with the venturi.

However, it has been found that in the '409 Patent's configuration of the spout assembly 200, small amounts of fluid can leak through the bore 250 in the check valve poppet 204 after the check valve poppet 204 "closes" against the conical wall 216 on the inner surface of the bleeder seat 202. This undesirable fluid leakage can trickle through the spout assembly 200 and out the spout 214.

Figure 13:
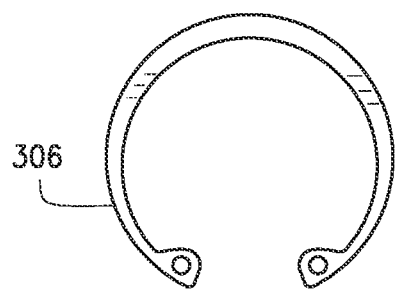
FIG. 13 is an axial view of the retaining ring of the leak stop assembly of FIG. 1.
Figure 14:
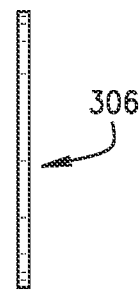
FIG. 14 is a side view of the retaining ring of FIG. 13.
Figure 15:
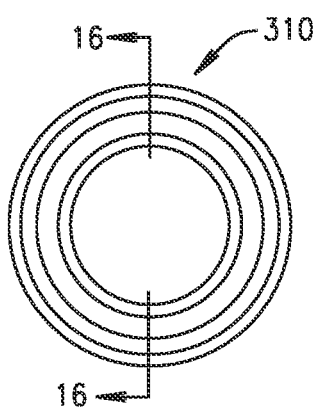
FIG. 15 is an axial view of the bleeder seat of the leak stop assembly of FIG. 1.

Referring now to FIGS. 1, and 5-16, it can be seen that in the present disclosure, in order to resolve this leak problem, the spout assembly 200 of the '409 Patent has been modified herein by the inclusion of the leak stop assembly 300 that includes a flat, circular metal cross-brace 302 (See FIGS. 9-10), a rubber plug 304 (See FIGS. 11-12) and a spring metal snap ring 306 (See FIGS. 13-14). Further, the bleeder seat 202 of the spout assembly 200 has been modified to a configuration 310 (See FIGS. 15-16) that has an annular contour 312 on its inner surface that is sized and shaped to receive and secure the cross-brace 302 and the snap ring 306. More particularly, the bleeder seat 310 has an inlet end 314 and an outlet end 316 opposite the inlet end 314. As can be seen, a frustoconical bore 318 extends inward and tapers downward along and about the central axis of the bleeder seat 310 from the inlet end 314 toward the center of the bleeder seat 310, where the bore 318 mates with and opens into an opposing and coaxial frustoconical bore 320 that opens in the outlet end 316 of the bleeder seat 310. The bore 320 forms the conical wall 216 that mates with the check valve 214.

The rigid metal cross-brace 302 has a generally uniform thickness of approximately 0.062 inches, and comprises a flat ring 302R1 with a flat cross-member 302C that stretches across the ring 302R1. The ring 302R1 has a width of approximately 0.125 inches and an outer diameter of approximately 1.420 inch, which is sized to fit within the bore 318 near the inlet 314. The cross member 302C is a chord that spans across the center of the ring 302R1. Cross member 302C has a width of approximately 0.125 inches, but incorporates a flat circular center ring 302R2 that is concentric with the center point of the ring 302R1. The center ring 302R2 has an outer diameter of approximately 0.312 inches and an inner diameter of approximately 0.190 inch.

Figure 7:
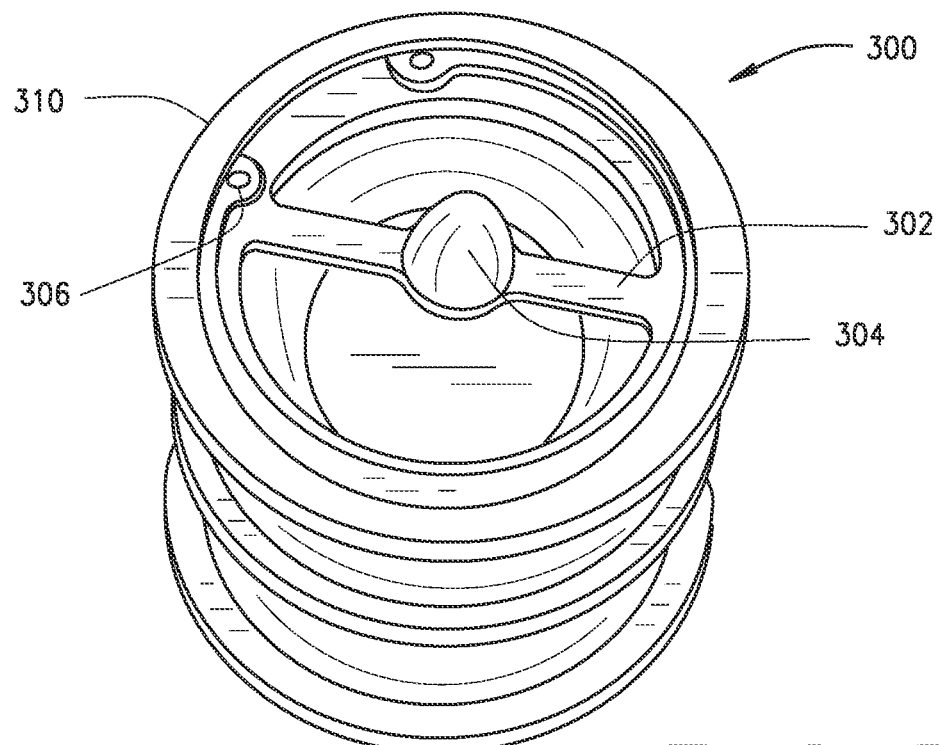
FIG. 7 is an exploded perspective view of the nozzle of FIG. 5.
Figure 8:
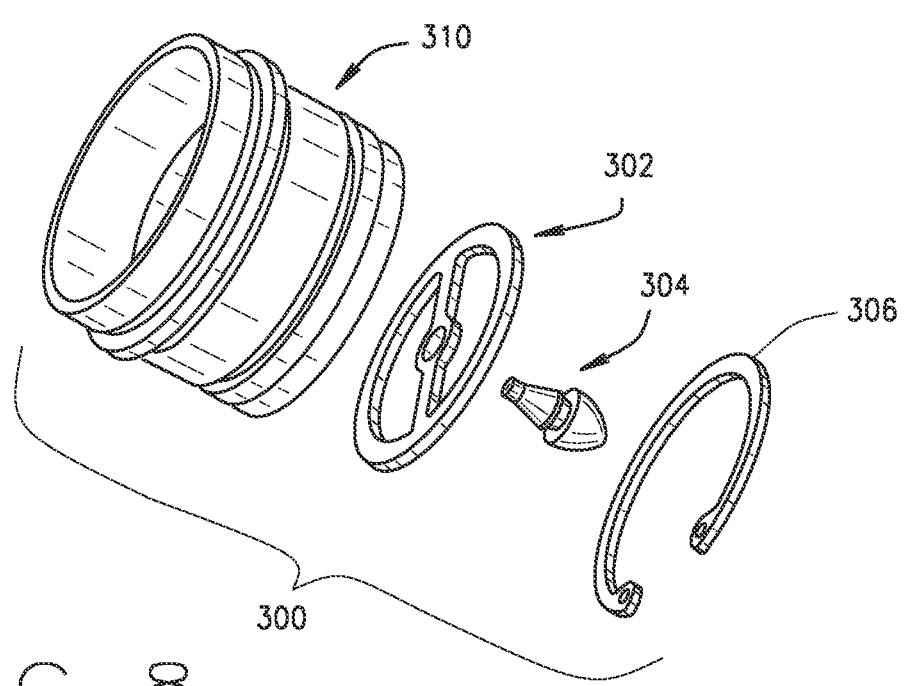
FIG. 8 is an exploded perspective view of the leak stop assembly of FIG. 1.

Referring to FIG. 12, rubber plug 304 is approximately 0.630 inches long, has a proximal end 304P, and a distal end 304D with a central axial groove 304G positioned approximately midway between the ends 304P and 304D. The larger proximal end 304P forms a bullet-shaped sloping cone 304C directed away from the center groove 304G, while the smaller distal end 304D forms a sloping conical frustrum 304F that is likewise directed away from the center groove 304G. The cone 304C has a length of approximately 0.29 inches and a diameter of approximately 0.313 inches at its greatest width, and tapers to a point or tip at the proximal end 304P of the plug 304. The frustrum 304F has a length of approximately 0.275 inches and a diameter of approximately 0.210 inches at its greatest width. The frustrum 304F has a thin, uniform radial band at its base adjoining the groove 304G and a coaxial, cylindrical nub 304N with a diameter of approximately 0.100 inches and a length of approximately 0.030 inches at the distal end 304D. The center groove 304G is cylindrical, and has a uniform diameter of approximately 0.165 inches and a uniform width of approximately 0.065 inch. The center groove 304G is sized to fit snugly in the circular center ring 302R2 of the cross-brace 302, such that the cone 304C and the frustrum 304F overlap the outer edge of the center ring 302R2 to hold the plug 304 snugly onto the ring 304R2. That is, the nub 304N can freely fit into and through the center ring 302R2, while the frustrum 304F can also fit into or through the center ring 302R2, but must be compressed in order to do so. The proximal end 304P is too large, even if compressed, to fit through the center ring 302R2. Thus, as can be appreciated, the plug 304 can be secured to the cross-brace 302 with the center groove 304G positioned in the center ring 302R2, and the proximal end 302P and distal end 302D each directed perpendicularly in opposite directions from the cross-brace 302, as shown in FIGS. 1 and 7.

Figure 16:
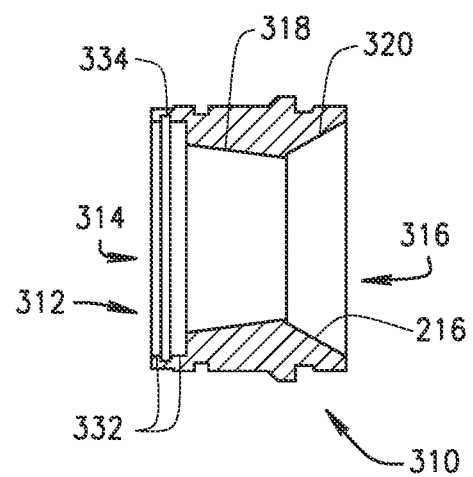
FIG. 16 is a cross-sectional side view of the bleeder seat of FIG. 15.
Figure 17:
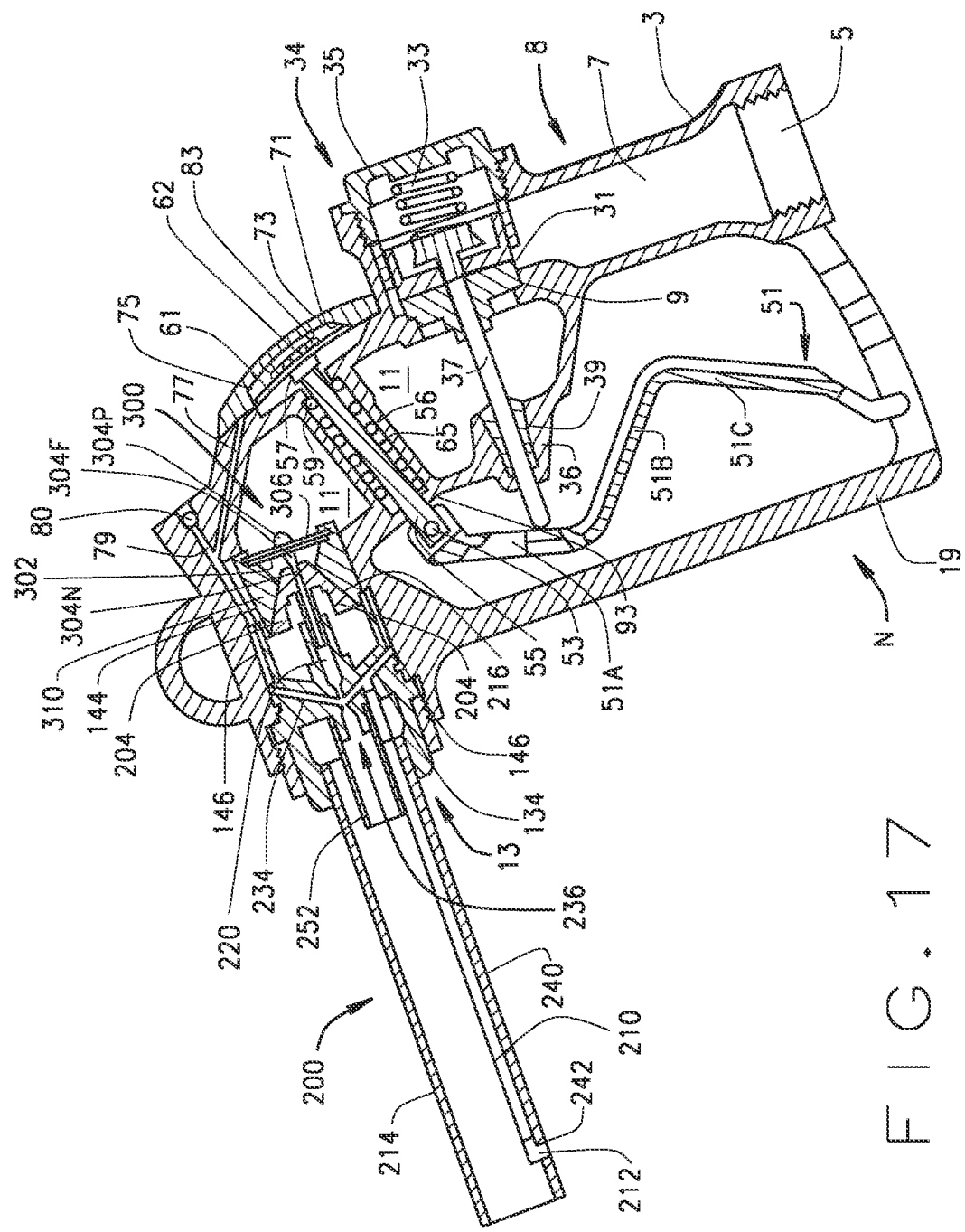
FIG. 17 is an additional cross-sectional view of FIG. 1.

Referring to FIG. 16, it can be seen that the annular contour 312 extends inward from the inlet end 314 of the bleeder seat 310 and is coaxial with the bores 318 and 320. The contour 312 contains two coaxial and adjoining annular tracks of differing depths—a wide track 332 and a narrow central track 334—with each track having a different diameter. That is, narrow track 334 has a diameter of approximately 1.494 inches, which is slightly greater than the 1.434 inch diameter of wide track 332. While wide track 332 has an overall width of approximately 0.220 inches, narrow track 334 has a width of approximately 0.060 inches, so that narrow track 334 is sized to snugly receive the snap ring 306, as shown. Further, as can be seen in the Figures, narrow track 334 forms a circular groove in the middle of wide track 332, and more particularly, narrow track 334 is axially positioned just off the center of the wide track 332 such that the cross-brace 302 can be positioned and secured against the innermost edge of the wide track 332 by the snap ring 306, when the snap ring 306 is secured in narrow track 334.

As can be appreciated, in this way, when the cross-brace 302 is properly positioned in the wide track 332 of the contour 312, and the snap ring 306 is properly positioned in its expanded condition in the narrow track 334 of the contour 312, the snap ring 306 will removably secure the cross-brace 302 in the contour 312 in the bore 318 of the bleeder seat 310. The cross-brace 302 can be readily removed from the bleeder seat 310 by simply first removing the snap ring 306 from the track 334.

As can be further appreciated, the position of the wide track 332 in the contour 312, the shape of the cross-brace 302 and the shape of the rubber plug 304 are all configured such that when the plug 304 is properly positioned in the cross-brace 302 (as shown and previously described), and the cross-brace 302 is properly secured in the wide track 332 of the contour 312 (as shown and previously described), then the cylindrical nub 304N of the distal end 304D of the plug 304 will extend partially into, and the frustrum 304F will press against, the opening 251 of the axial through bore 250 in the check valve poppet 204 when the check valve poppet 204 presses against the conical surface 216 of the bleeder seat 310 as the nozzle N shuts off fluid flow (see FIGS. 1, 5-6, 12, 17). As can be appreciated, the plug 304 thereby seals shut the through bore 250 of the check valve poppet 204 when the flow of fluid through the nozzle N has been stopped, and thereby prevents leakage of fluid in the nozzle N upstream of the check valve poppet 204.

While I have described in the detailed description a configuration that may be encompassed within the disclosed embodiments of this invention, numerous other alternative configurations, that would now be apparent to one of ordinary skill in the art, may be designed and constructed within the bounds of my invention as set forth in the claims. Moreover, the above-described novel high pressure fuel nozzle leak stop assembly 300 of the present invention can be arranged in a number of other and related varieties of configurations without expanding beyond the scope of our invention as set forth in the claims.

For example, it is not necessary that the cross-brace 302 have the exact configuration or sizing as described and shown. Rather, the cross-brace 302 can be configured in a wide variety of shapes and sizes, so long as the cross-brace 302 can be properly secured to or against the modified bleeder seat 310 near the inlet 314, and performs the function of securing the plug 304 in its position, orientation and with adequate bracing to allow the cylindrical nub 304N of the distal end 304D of the plug 304 will extend partially into, and the frustrum 304F to press against, the opening 251 of the axial through bore 250 in the check valve poppet 204 when the check valve poppet 204 presses against the conical surface 216 of the bleeder seat 310 as the nozzle N shuts off fluid flow. That is, by way of example, the cross-brace 302 could be square, rectangular or any of a variety of other shapes. Further, the cross-brace 302 can be thicker or thinner, and the components can be wider or thinner, than shown, and can be non-uniform in thickness, so long as the cross-brace 302 provides the functions as stated herein. By way of further example, the cross-brace 302 can have various central structures, other than the cross member 302C to hold and secure the ring 302R1 in position. Such other structures may include more than one chord, one or more radial arms, or a webbing.

Similarly, the plug 304 need not have the exact configuration or sizing as described and shown. Rather, the plug 304 can be configured in a wide variety of shapes and sizes, so long as the plug 304 can be properly secured in place in the assembly 300 and performs the function of sealing the axial through bore 250 in the check valve poppet 204 when the check valve poppet 204 presses against the conical surface 216 of the bleeder seat 310 as the nozzle N shuts off fluid flow. For example, the conical frustrum 304F and the cylindrical nub 304N can have a wide variety of shapes and sizes, so long as they collectively provide a sufficient and resilient seal against the axial through bore 250. Similarly, the cone 304C can be of varying configurations and sizes, so long as the cone 304C properly assists in securing the plug 304 to the cross-brace 302. Further, the configuration of the entire plug 304 can vary in order to accommodate a proper fit with varying configurations of the cross-brace 302 as discussed above. In addition, the plug 304 can be comprises of a variety of materials other than rubber, so long as the plug 304 is capable of performing the functions as stated in this disclosure.

Moreover, the annular contour 312 need not have the exact configuration or sizing as described and shown. Rather, the annular contour 312 can be configured in a wide variety of shapes and sizes, so long as the cross-brace 302 can be properly secured in place in the assembly 300 and performs the function of properly securing and positioning the plug 304 in place to adequately seal the axial through bore 250 in the check valve poppet 204 when the check valve poppet 204 presses against the conical surface 216 of the bleeder seat 310 as the nozzle N shuts off fluid flow. For example, the narrow track 334 can be wider or more narrow to accommodate differing sizes of alternate snap rings 306. Similarly, the wide track 332 can be wider or more narrow, or of differing shapes, in order to accommodate differing sizes and shapes of alternate cross-braces 302.

Additional variations or modifications to the configuration of the above-described novel high pressure fuel nozzle leak stop assembly 300 of the present invention may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of my invention.

The invention claimed is:

1. A leak stop assembly for an automatic shut-off fluid nozzle, said nozzle having a first fluid flow path there through, said leak stop assembly comprising:
   a. a check valve having a poppet, said poppet positioned in said first fluid flow path, said poppet having an open position and a closed position relative to said first fluid flow path, said poppet limiting fluid flow through said first fluid flow path when said poppet is in its said closed position, said poppet defining a primary fluid flow path in said first fluid flow path about said poppet when said poppet is in its said open position, said poppet having a through bore, said poppet through bore having an open end exposed to said first fluid flow path, said poppet defining a secondary fluid flow path in said first fluid flow path through said poppet through bore;

b. a plug sized and shaped to engage at least in part said open end of said poppet through bore; and c. a support member positioned within said first fluid flow path, said support member holding said plug at a position proximate said open end of said poppet through bore, said plug being oriented in said support member to engage at least in part said poppet through bore open end when said poppet is in its said closed position, said plug limiting fluid flow through said second flow path when said plug engages said open end.

2. The leak stop assembly of claim 1, wherein said plug is sized and shaped to fit at least in part in said open end of said poppet through bore.

3. The leak stop assembly of claim 1, wherein said poppet comprises a piston, said piston being positioned in said first fluid flow path, said piston having an open position and a closed position relative to said first fluid flow path, said piston limiting fluid flow through said first fluid flow path when said piston is in its said closed position, said piston defining at least in part said primary fluid flow path in said first fluid flow path about said piston when said piston is in its said open position, said piston having a through bore, said piston through bore having an open end exposed to said first fluid flow path, said piston defining at least in part said secondary fluid flow path in said first fluid flow path through said piston through bore.

4. The leak stop assembly of claim 1, wherein at least a portion of said plug simultaneously engages at least in part said open end of said poppet through bore when said poppet is in moves to its said closed position.

5. The leak stop assembly of claim 1, wherein said support member further comprises a cross-member that extends across said first fluid flow path, said cross-member retaining said plug in said first fluid flow path.

6. The leak stop assembly of claim 5, further comprising a bleeder seat, said bleeder seat having an inlet and an outlet and a cavity there between open to said inlet and said outlet, said bleeder seat having a first face in said cavity, said bleeder seat being positioned in said nozzle first fluid flow path relative to said poppet such that fluid flows through said inlet and into said cavity and past said poppet when said check valve poppet is in its said open position, said bleeder seat receiving and seating said poppet against said first face when said poppet is in its said closed position, said support member attaching to said bleeder seat proximate said poppet, said bleeder seat and said poppet defining a first length from said first face to said plug in which said plug engages said poppet through bore open end when said poppet is in its said closed position.

7. The leak stop assembly of claim 1, wherein at least a portion of said plug comprises a pliant material, said support member engaging at least part of said plug pliant portion against at least part of said poppet proximate said poppet through bore when said poppet is in its said closed position.

8. The leak stop assembly of claim 7, wherein said plug pliant portion comprises a frustoconical extension, said frustoconical extension engaging at least in part said open end of said poppet through bore when said poppet is in its said closed position.

* * * * *